United States Patent
Ogaki et al.

(10) Patent No.: US 11,894,535 B2
(45) Date of Patent: Feb. 6, 2024

(54) BATTERY MANAGEMENT SUPPORT DEVICE AND BATTERY MANAGEMENT SUPPORT METHOD

(71) Applicant: HONDA MOTOR CO., LTD., Tokyo (JP)

(72) Inventors: Toru Ogaki, Tokyo (JP); Haruki Komazawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 228 days.

(21) Appl. No.: 17/355,795

(22) Filed: Jun. 23, 2021

(65) Prior Publication Data

US 2021/0408616 A1 Dec. 30, 2021

(30) Foreign Application Priority Data

Jun. 29, 2020 (JP) .................. 2020-112090

(51) Int. Cl.

| | |
|---|---|
| *H01M 10/625* | (2014.01) |
| *B60L 58/26* | (2019.01) |
| *H01M 10/613* | (2014.01) |
| *H01M 10/63* | (2014.01) |
| *B60L 53/66* | (2019.01) |

(52) U.S. Cl.
CPC ......... *H01M 10/625* (2015.04); *B60L 53/665* (2019.02); *B60L 58/26* (2019.02);

(Continued)

(58) Field of Classification Search
CPC .. H01M 10/625; H01M 10/613; H01M 10/63; H01M 10/443; H01M 10/46;
(Continued)

(56) References Cited

U.S. PATENT DOCUMENTS

| | | | |
|---|---|---|---|
| 2010/0019729 A1 | 1/2010 | Kaita et al. | |
| 2010/0212338 A1 | 8/2010 | Hermann et al. | |

(Continued)

FOREIGN PATENT DOCUMENTS

| | | |
|---|---|---|
| JP | 2000-030766 A | 1/2000 |
| JP | 2003-203679 A | 7/2003 |

(Continued)

OTHER PUBLICATIONS

May 31, 2022, Japanese Office Action issued for related JP Application No. 2020-112090.

(Continued)

*Primary Examiner* — Paul Dinh

(74) *Attorney, Agent, or Firm* — Paratus Law Group, PLLC

(57) ABSTRACT

A battery management support device that is configured to acquire information on an electric vehicle including a battery that is rechargeable with electric power received from an external power supply. The information includes at least information when the electric vehicle is parked indicating a temperature of the battery, information when the electric vehicle is parked indicating an electrical connection state between the electric vehicle and the external power supply, and information when the electric vehicle is parked indicating an operation state of a cooling device for the battery.

8 Claims, 9 Drawing Sheets

(52) U.S. Cl.
CPC ......... *H01M 10/613* (2015.04); *H01M 10/63* (2015.04); *B60L 2260/56* (2013.01)

(58) Field of Classification Search
CPC ............. H01M 10/486; H01M 10/425; H01M 10/488; H01M 10/635; H01M 2010/4271; H01M 2010/4278; B60L 53/665; B60L 58/26; B60L 2260/56; B60L 2240/662; B60L 1/04; B60L 58/12; B60L 2240/545; B60L 2260/22; B60L 3/12; B60L 58/16; B60L 2250/12; B60L 2250/16; B60L 50/60; B60L 58/10; B60L 58/27; Y02E 60/10; Y02T 10/70; Y02T 10/7072; Y02T 10/72; Y02T 90/12; Y02T 90/16
USPC ........................................................ 320/150
See application file for complete search history.

(56) References Cited

U.S. PATENT DOCUMENTS

| | | | |
|---|---|---|---|
| 2010/0212339 A1* | 8/2010 | Kelty | B60L 58/26 62/157 |
| 2012/0021258 A1 | 1/2012 | Kelty et al. | |
| 2012/0046815 A1 | 2/2012 | Hermann et al. | |
| 2015/0162768 A1 | 6/2015 | Okuda et al. | |
| 2016/0288659 A1* | 10/2016 | Hammoud | B60L 58/24 |

FOREIGN PATENT DOCUMENTS

| | | |
|---|---|---|
| JP | 2007-049771 A | 2/2007 |
| JP | 2007-080727 A | 3/2007 |
| JP | 2010-035280 A | 2/2010 |
| JP | 2010-200605 A | 9/2010 |
| JP | 2013-172476 A | 9/2013 |
| JP | 2013-198179 A | 9/2013 |
| JP | 2015-037011 A | 2/2015 |
| JP | 2015-042033 A | 3/2015 |
| JP | 2017-097971 A | 6/2017 |
| WO | WO 2013/179350 A1 | 12/2013 |

OTHER PUBLICATIONS

Nov. 30, 2021, Japanese Office Action issued for related JP Application No. 2020-112090.

* cited by examiner

FIG. 3

| TIME STAMP | BATTERY-RELATED INFORMATION (BATTERY ID: BAT001) | | | |
|---|---|---|---|---|
| | REMAINING CAPACITY OF BATTERY [%] | CONNECTION STATE WITH EXTERNAL POWER SUPPLY | BATTERY TEMPERATURE [°C] | OPERATION STATE OF COOLING DEVICE |
| April 1, 2019 at 9:00 | X0 | DISCONNECTED | T0 | STOPPED |
| ... | ... | ... | ... | ... |
| June 1, 2020 at 10:00 | X1 | DISCONNECTED | T1 | STOPPED |
| June 1, 2020 at 10:01 | X2 | DISCONNECTED | T2 | OPERATING |
| June 1, 2020 at 10:02 | X3 | CONNECTED | T3 | OPERATING |
| ... | ... | ... | ... | ... |

BATTERY MANAGEMENT SUPPORT DEVICE AND BATTERY MANAGEMENT SUPPORT METHOD

CROSS-REFERENCE TO RELATED APPLICATION

The present application claims the benefit of priority of Japanese Patent Application No. 2020-112090, filed on Jun. 29, 2020, the content of which is incorporated herein by reference.

TECHNICAL FIELD

The present invention relates to a battery management support device and a battery management support method.

BACKGROUND ART

In the related art, there is a vehicle including a traction motor for traveling that outputs a torque for traveling to driven wheels and a battery that supplies electric power to the traction motor (hereinafter, also referred to as an electric vehicle). A battery of some electric vehicles, such as so-called plug-in hybrid vehicles and electric vehicles, can be charged with electric power that is received from an external power supply.

When the battery is in a high-temperature state, deterioration of the battery progresses significantly. Therefore, a technique for cooling a battery has been proposed. For example, JP2015-037011A describes a technique in which, when it is detected that a battery is in a high-temperature and high-SOC state for a predetermined number of times or more at predetermined time intervals while a system of an electric vehicle is stopped, the battery is cooled by operating a fan for cooling the battery or a pump for pumping a refrigerant cooling the battery using electric power of the battery, so that deterioration of the battery is suppressed.

JP2017-097971A describes a technique in which, when an electric vehicle is parked, a temperature adjustment control unit operates a temperature adjustment unit to maintain a temperature of a battery within a desired temperature range, and an operation of the temperature adjustment unit uses electric power from a power outlet that is an external power supply.

A life of batteries vary greatly depending on how the battery has been used. For example, when a battery is heated to a high temperature, the battery tends to deteriorate significantly. For this reason, a battery that has been used in a high-temperature state for a long period of time tends to deteriorate compared to a battery that has been used at an appropriate temperature, and as a result, the life tends to be shortened. In other words, if the battery can be managed so as to be used in an appropriate state, the deterioration of the battery can be suppressed so that a life of the battery can be prolonged. There is, however, a room for improvement in that such battery management is possible in the related art.

SUMMARY

The present invention provides a battery management support device and a battery management support method that are capable of appropriately managing a battery of an electric vehicle.

A first aspect of the present invention is a battery management support device that is configured to acquire information on an electric vehicle including a battery that is rechargeable with electric power received from an external power supply,
in which the information includes at least:
information when the electric vehicle is parked indicating a temperature of the battery;
information when the electric vehicle is parked indicating an electrical connection state between the electric vehicle and the external power supply; and
information when the electric vehicle is parked indicating an operation state of a cooling device for the battery.

A second aspect of the present invention is a battery management support method for supporting battery management in an electric vehicle including a battery that is rechargeable with electric power received from an external power supply, the method including:
a step in which a predetermined notice is issued to a user or an owner of the electric vehicle in accordance with a determination result based on acquired information of the electric vehicle,
in which the information includes at least:
information when the electric vehicle is parked indicating a temperature of the battery;
information when the electric vehicle is parked indicating an electrical connection state between the electric vehicle and the external power supply; and
information when the electric vehicle is parked indicating an operation state of a cooling device of the battery, and
in which, in the step, when it is determined, based on the information, that the electric vehicle and the external power supply are not electrically connected, and a cooling condition of the battery is satisfied, a connection recommendation notice is issued to urge an electrical connection between the electric vehicle and the external power supply.

A third aspect of the present invention is a battery management support method for supporting battery management in an electric vehicle including a battery that is rechargeable by electric power received from an external power supply, the method including:
a step in which a predetermined notice is issued to a user or an owner of the electric vehicle in accordance with a determination result based on acquired information of the electric vehicle,
in which the information includes at least:
information when the electric vehicle is parked indicating a temperature of the battery;
information when the electric vehicle is parked indicating an electrical connection state between the electric vehicle and the external power supply; and
information when the electric vehicle is parked indicating an operation state of a cooling device of the battery, and
in which, in the step, when it is determined, based on the information, that there is influence on a performance guarantee of the battery, a guarantee guidance notice for offering information on the performance guarantee of the battery is issued According to the present invention, it is possible to provide the battery management support device and the battery management support method that are capable of appropriately managing the battery of the electric vehicle.

BRIEF DESCRIPTION OF DRAWINGS

FIG. 3 is a diagram showing a battery-related information table stored in the battery monitoring device of FIG. 2.

DESCRIPTION OF EMBODIMENTS

Hereinafter, an embodiment of a battery management support device and a battery management support method according to the present invention will be described in detail with reference to the drawings.

Figure 1:
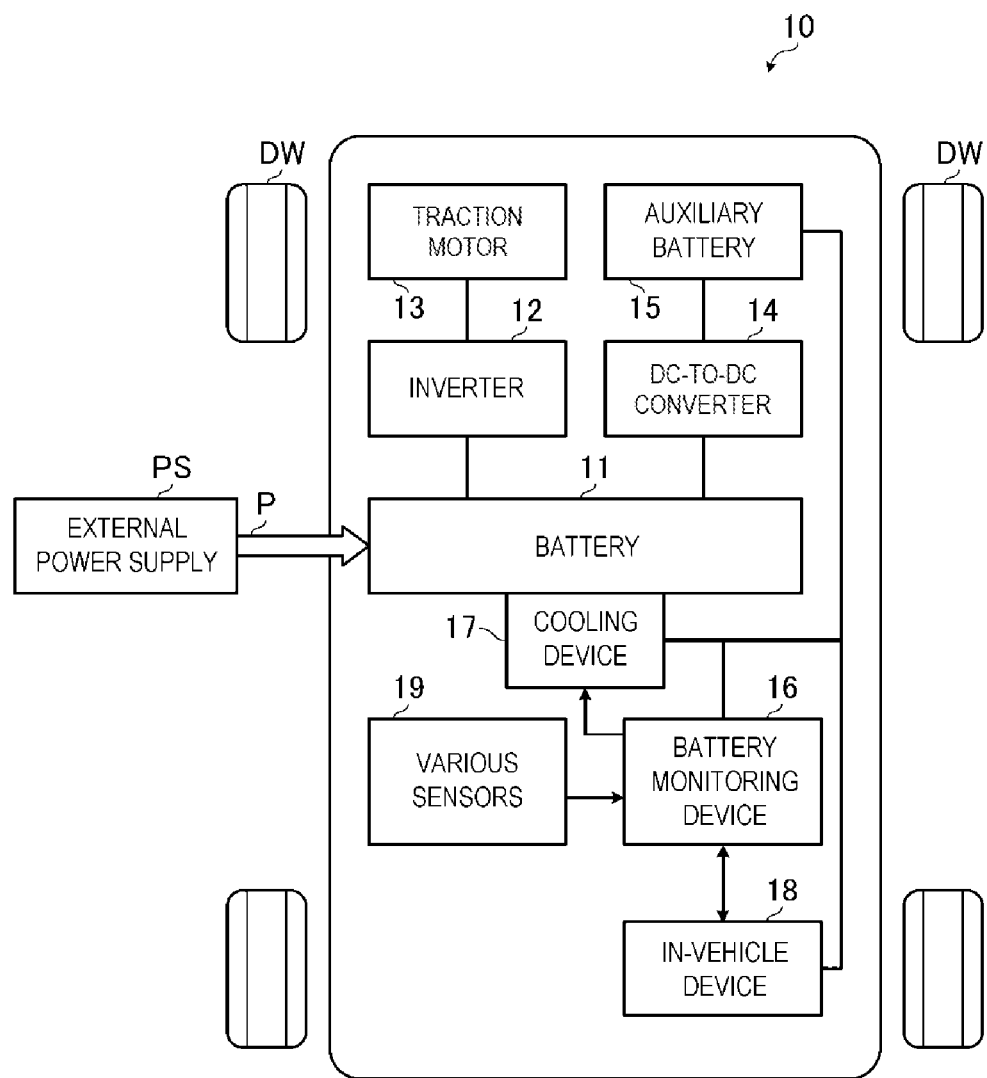
FIG. 1 is a diagram showing an electric vehicle according to an embodiment of the present invention.

[Electric Vehicle] As shown in FIG. 1, an electric vehicle 10, an example of an electric vehicle according to the present invention, is an electric automobile and includes a battery 11 that is a secondary battery rechargeable with electric power P received from an external power supply PS. The external power supply PS is, for example, a utility power supply that supplies an alternating current having a predetermined voltage (for example, 100 to 200 [V]) and a predetermined frequency (for example, 50 to 60 [Hz]).

The electric vehicle 10 is configured to be electrically connectable to the external power supply PS. An electrical connection between the electric vehicle 10 and the external power supply PS may be realized by a physical connector, a cable, or the like or may be realized by non-contact power transmission (wireless power transfer). When non-contact power transmission is adopted, inductive coupling, resonant inductive coupling, and a combination of inductive coupling and resonant inductive coupling can be used as the power transmission method.

For example, the electric power P received from the external power supply PS is converted from an alternating current to a direct current by a charger (not illustrated) provided in the electric vehicle 10 to a voltage suitable for charging the battery 11 and then supplied to the battery 11. Accordingly, the battery 11 of the electric vehicle 10 can be charged with the electric power P received from the external power supply PS.

The battery 11 is configured to output a high voltage (for example, 100 to 400 [V]) by connecting a plurality of power storage cells in series and is connected to a traction motor 13 via an inverter 12. As the power storage cells of the battery 11, a lithium-ion battery, a nickel-hydrogen battery, or the like can be used. The inverter 12 is configured to convert a direct current output from the battery 11 to an alternating current and to supply the converted alternating current to the traction motor 13 realized by an alternating current motor such as a three-phase motor.

The traction motor 13 is coupled to driven wheels DW via a power transmission device (not illustrated) included in the electric vehicle 10 and is configured to output a torque (torque for traveling) that causes the electric vehicle 10 to travel to the driven wheels DW by supplying electric power. Therefore, supplying the electric power of the battery 11 to the traction motor 13, the electric vehicle 10 can travel with the torque output by the traction motor 13.

The traction motor 13 can also perform regeneration as the electric vehicle 10 brakes and output the generated electric power (alternating current) to the inverter 12. In this case, the inverter 12 converts the alternating current output from the traction motor 13 into a direct current and supplies the converted direct current to the battery 11. Accordingly, the battery 11 of the electric vehicle 10 can be charged with the electric power generated by the traction motor 13 as the electric vehicle 10 brakes.

The battery 11 is connected to an auxiliary battery 15 via a DC-to-DC converter 14 that steps down a high-voltage output from the battery 11 to a predetermined voltage (for example, 12 [V]). Accordingly, the auxiliary battery 15 of the electric vehicle 10 can be charged with the electric power of the battery 11.

The auxiliary battery 15 is a battery that is configured to supply a low-voltage electric power (for example, 12 [V]) suitable for various auxiliary devices included in the electric vehicle 10 such as a battery monitoring device 16, a cooling device 17, and an in-vehicle device 18, which will be described later, and is realized by a lead-acid battery or the like.

In the present embodiment, when a remaining capacity (SOC: state of charge) of the auxiliary battery 15 decreases by supplying electric power to various auxiliary devices such as the cooling device 17, the auxiliary battery 15 is appropriately charged with the electric power of the battery 11. In other words, various auxiliary devices such as the cooling device 17 can be operated using the electric power of the battery 11.

The battery monitoring device 16 is an example of a battery management support device of the present invention and is a control device (computer) that is configured to acquire information on the electric vehicle 10. Based on the acquired information, the battery monitoring device 16 can also control the operation of the cooling device 17 and can issue a predetermined notice to a user or an owner of the electric vehicle 10.

Examples of the information acquired by the battery monitoring device 16 include battery-related information related to the battery 11. Although details will be described later with reference to FIG. 3, the battery-related information includes information indicating a temperature of the battery 11 (hereinafter, also referred to as a battery temperature), information indicating an electrical connection state between the electric vehicle 10 and the external power supply PS, and information indicating an operation state of the cooling device 17.

Here, the information indicating the electrical connection state between the electric vehicle 10 and the external power supply PS indicates whether the electric vehicle 10 and the external power supply PS are electrically connected, which reads "connected" when the electric vehicle 10 and the external power supply PS are electrically connected and reads "disconnected" when the electric vehicle 10 and the external power supply PS are not electrically connected, for example. In addition, the information indicating the operation state of the cooling device 17 indicates whether the cooling device 17 is in an operation state, which reads "operating" when the cooling device 17 is operating and reads "stopped" when the cooling device 17 is not operating, for example.

The battery monitoring device 16 is configured to acquire the battery-related information when the electric vehicle 10 is parked, for example. That is, the battery-related information includes information w % ben the electric vehicle 10 is parked (for example, when an operation of a system that causes the electric vehicle 10 to travel (for example, the inverter 12 or the traction motor 13) is stopped with an ignition power supply of the electric vehicle 10 turned off) indicating a battery temperature, an electrical connection state between the electric vehicle 10 and the external power supply PS, the operation state of the cooling device 17, and the like. Note that the battery monitoring device 16 may acquire the battery-related information even when the electric vehicle 10 is activated (for example, when the system that causes the electric vehicle 10 to travel is activated).

Figure 2:
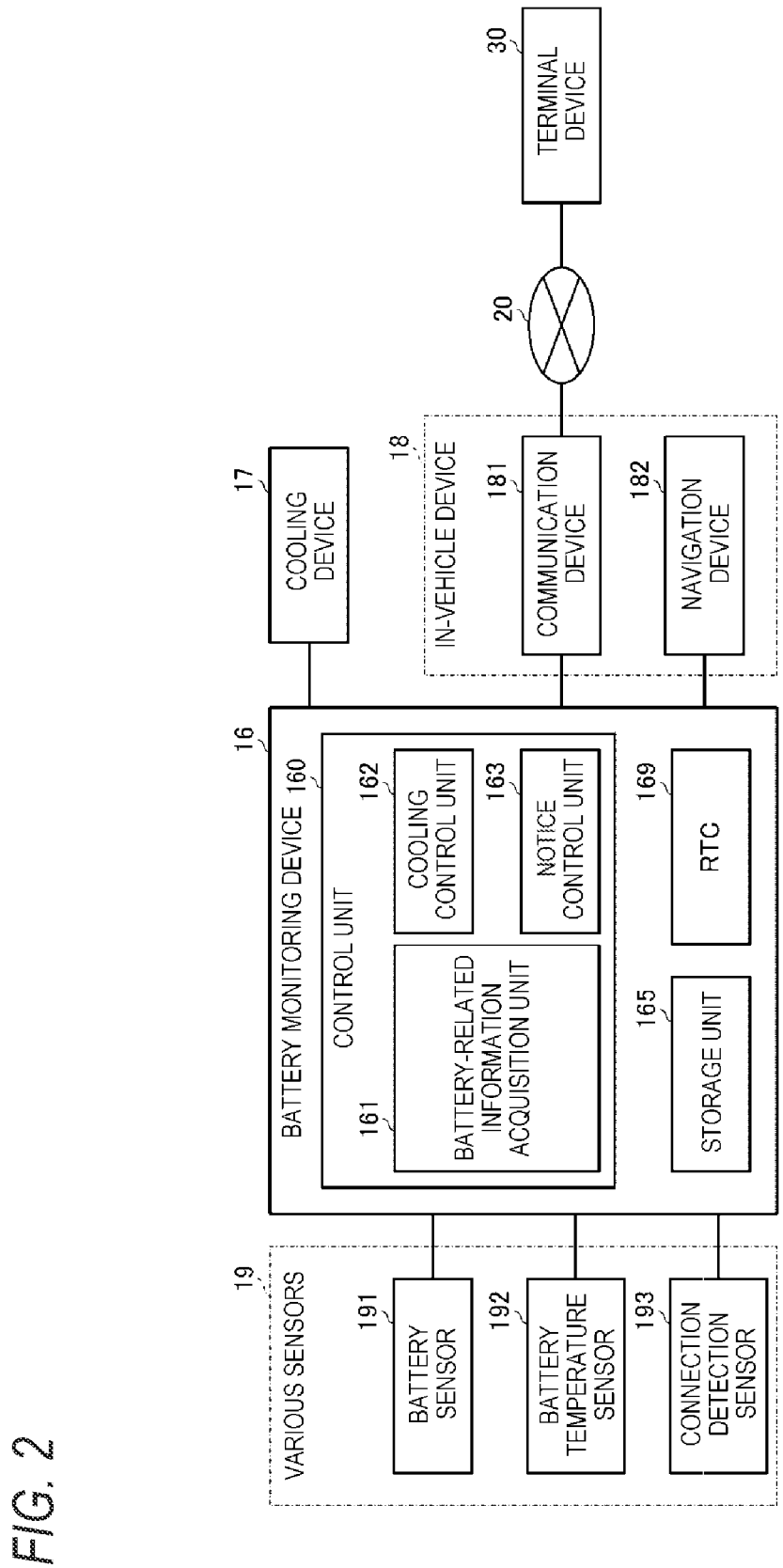
FIG. 2 is a diagram showing a functional configuration of a battery monitoring device included in the electric vehicle of FIG. 1.

The battery monitoring device 16 can be realized by, for example, an electronic control unit (ECU) that includes a processor that is configured to perform various operations, a storage device that stores various information, an input/output device that is configured to control input and output of data between the inside and the outside of the battery monitoring device 16, and a real-time clock that indicates time (RTC, see a reference numeral 169 in FIG. 2). The battery monitoring device 16 will be described later again.

The cooling device 17 includes a fan (not illustrated) for cooling the battery 11, a pump (not illustrated) for pumping a refrigerant cooling the battery 11, and the like and is configured to operate in accordance with a control of the battery monitoring device 16 to cool the battery 11. In addition to the cooling device 17, the electric vehicle 10 may further include a heating device including a heater for heating the battery 11 and the like. In that case, w % ben at a low temperature, the battery 11 can be heated by the heating device so that the battery 11 is used at an appropriate temperature.

The in-vehicle device 18 is an electronic device that is provided in the electric vehicle 10 in a state where the in-vehicle device 18 can communicate with the battery monitoring device 16. For example, as shown in FIG. 2, the in-vehicle device 18 includes a communication device 181 that is connected to a network 20 such as a mobile communication network, the Internet, a wide area network (WAN), and a local area network (LAN) and a navigation device 182 that includes a global navigation satellite system (GNSS) receiver, map data, a display, an operation button (including a touch panel), and the like.

The battery monitoring device 16 can appropriately communicate with another computer via the communication device 181 and can appropriately acquire information (for example, a current position and a traveling/parking schedule of the electric vehicle 10) that is necessary for executing a process to be described later from the navigation device 182. Examples of the other computers include a terminal device 30 of the user or the owner of the electric vehicle 10, a server provided outside the electric vehicle 10, and the like. Examples of the terminal device 30 include a smartphone, a tablet computer, and a laptop computer, and the like. Note that the information on the terminal device 30, such as information that is necessary for the battery monitoring device 16 to communicate with the terminal device 30, is set for the battery monitoring device 16 by the user, the owner, or the like of the electric vehicle 10 in advance.

The electric vehicle 10 is provided with various sensors 19 in a state of capable of communicating with the battery monitoring device 16. As shown in FIG. 2, the various sensors 19 include a battery sensor 191 that is configured to detect an output (for example, an terminal voltage or a charging/discharging current) of the battery 11, a battery temperature sensor 192 that is configured to detect the battery temperature, and a connection detection sensor 193 that is configured to detect the electrical connection state between the electric vehicle 10 and the external power supply PS.

Detection results of the various sensors 19 are sent to the battery monitoring device 16 as detection signals. Therefore, the battery monitoring device 16 can acquire the output of the battery 11 based on the detection signal from the battery sensor 191, the battery temperature based on the detection signal from the battery temperature sensor 192 and the connection state between the electric vehicle 10 and the external power supply PS based on the detection signal from the connection detection sensor 193.

[Battery Monitoring Device] As shown in FIG. 2, the battery monitoring device 16 includes a control unit 160, a storage unit 165, and an RTC 169. The control unit 160 is a functional unit that is configured to perform various controls in the battery monitoring device 16 and is realized by, for example, the processor's executing a program stored in a storage device of the battery monitoring device 16. In addition, the storage unit 165 is a functional unit that stores processing results (for example, battery-related information) of the control unit 160 and is realized by, for example, the storage device of the battery monitoring device 16.

The control unit 160 includes a battery-related information acquisition unit 161 that is configured to acquire the battery-related information, a cooling control unit 162 that is configured to control the operation of the cooling device 17 based on the battery-related information acquired by the battery-related information acquisition unit 161, and a notice control unit 163 that is configured to issue various notices based on the battery-related information acquired by the battery-related information acquisition unit 161.

When the electric vehicle 10 is parked, the battery-related information acquisition unit 161 acquires the battery-related information at a predetermined cycle (for example, even 1 minute) based on a time measured by RTC 169. The battery-related information acquired by the battery-related information acquisition unit 161 is stored in a battery-related information table 50 shown in FIG. 3. The battery-related information table 50 is provided in the storage unit 165 and stores the battery-related information acquired by the battery-related information acquisition unit 161 as a record.

As shown in FIG. 3, the battery-related information includes information indicating a time stamp, the remaining capacity (SOC) of the battery 11, the connection state between the electric vehicle 10 and the external power supply PS, the battery temperature, and the operation state of the cooling device 17.

The time stamp in the battery-related information represents a time measured by the RTC 169 when the battery-related information is acquired. The remaining capacity of the battery 11 in the battery-related information represents the remaining capacity of the battery 11 based on the output of the battery 11 detected by the battery sensor 191 when the battery-related information is acquired. The connection state with the external power supply PS in the battery-related information represents the connection state with the external power supply PS detected by the connection detection sensor 193 when the battery-related information is acquired. The battery temperature in the battery-related information represents the battery temperature detected by the battery temperature sensor 192 when the battery-related information is acquired. The operation state of the cooling device 17 in the battery-related information represents the operation state of the cooling device 17 when the battery-related information is acquired.

For example, the battery-related information 51 shown in FIG. 3 indicates that, at a time of "Jun. 1, 2020 at 10:00," the remaining capacity of the battery 11 is "X1%," the connection state between the electric vehicle 10 and the external power supply PS is "disconnected" (that is, a state where the electric vehicle 10 and the external power supply PS are not electrically connected), the battery temperature is "T1 degree(s) Celsius," and the operation state of the cooling device 17 is "stopped" (that is, a state where the cooling device 17 is not operating).

The battery monitoring device 16 can recognize the remaining capacity of the battery 11, the connection state between the electric vehicle 10 and the external power supply PS, the battery temperature, and the operation state of the cooling device 17 when the electric vehicle 10 is parked at each time referring to each piece battery-related information stored in the battery-related information table 50.

The battery monitoring device 16 is configured to store a battery ID (see "BAT001" in FIG. 3) for identifying the battery 11 in association with each piece of battery-related information in the battery-related information table 50. Accordingly, it is possible to store the battery-related information for each battery 11 and detect that the battery 11 has been replaced in the electric vehicle 10. The battery ID can be acquired from, for example, a battery IC (not illustrated) included in the battery 11.

The cooling control unit 162 is configured to determine, based on the battery-related information acquired by the battery-related information acquiring unit 161, whether the cooling device 17 should be operated and to operate the cooling device 17 based on the determination result. Determining whether the cooling device 17 should be operated is by referring to a cooling condition that is a condition for cooling the battery 11, the connection state between the electric vehicle 10 and the external power supply PS, the remaining capacity of the battery 11, and the like.

Specifically, in the present embodiment, the cooling condition of the battery 11 is that the battery temperature is equal to or higher than Tth degree(s) Celsius. The Tth degree(s) Celsius is a threshold value predetermined by a manufacturer of the electric vehicle 10 or the like in consideration of an allowable maximum temperature of the battery 11 and the like. By operating the cooling device 17 to cool the battery 11 when the cooling condition of the battery 11 is satisfied, deterioration of the battery 11 caused by the high temperature of the battery 11 can be suppressed. In addition, when the battery temperature is lower than Tth degree(s) Celsius, that is, when the battery 11 is not required to be cooled, the cooling device 17 can be prevented from being operated so that a waste of electric power due to the operation the cooling device 17 can be suppressed.

The state of the battery 11 in which the battery temperature is equal to or higher than Tth degree(s) Celsius is hereinafter also referred to as a high-temperature state. In addition, a period in which the battery 11 is in the high-temperature state (that is, equal to or higher than Tth degree(s) Celsius) is hereinafter also referred to as a high-temperature period. Further, a cumulative value of the high-temperature period from the start of use of the battery 11 (for example, when the battery 11 is supplied with electricity for the first time after being mounted on the electric vehicle 10) is hereinafter also referred to as a cumulative high-temperature period.

Although, in the present embodiment, the cooling condition of the battery 11 is that the battery temperature is equal to or higher than Tth degree(s) Celsius, the present invention is not limited thereto. For example, the cooling condition of the battery 11 may be such that the battery temperature is predicted to be equal to or higher than Tth degree(s) Celsius. The prediction of whether the battery temperature will be equal to or higher than Tth degree(s) Celsius can be based on the traveling/parking schedule of the electric vehicle 10, for example. Here, the traveling/parking schedule of the electric vehicle 10 is information indicating a time at which the electric vehicle 10 is scheduled to travel or park, which can be acquired from the navigation device 182, for example.

More specifically, the navigation device 182 is configured to output the traveling/parking schedule registered by an input operation of the user of the electric vehicle 10 to the battery monitoring device 16, for example. In addition, the navigation device 182 may automatically generate the traveling/parking schedule by machine learning of a traveling history of the electric vehicle 10 and may output the automatically generated traveling/parking schedule to the battery monitoring device 16. The battery monitoring device 16 may acquire the traveling/parking schedule from the terminal device 30 not limited to the navigation device 182, for example.

Also, even when an air temperature around the electric vehicle 10 (so-called outside air temperature) is equal to or higher than Tth degree(s) Celsius, it is predicted that the battery temperature will be equal to or higher than Tth degree(s) Celsius. Therefore, the cooling condition of the battery 11 may be such that the air temperature around the electric vehicle 10 is equal to or higher than Tth degree(s) Celsius.

When the cooling device 17 is operated, electric power is consumed. If the electric vehicle 10 and the external power supply PS are not electrically connected, and the cooling device 17 is operated when the remaining capacity of the battery 11 is low, the electric power of the battery 11 running out is further reduced, so that a distance-to-empty of the electric vehicle 10 using the electric power of the battery 11 may be significantly shortened or the traveling itself may get impossible. In addition, it is also conceivable that the battery 11 gets into an over-discharged state as the electric power of the battery 11 running out is further reduced.

Therefore, in the present embodiment, even when the cooling condition of the battery 11 is satisfied, the cooling control unit 162 does not operate the cooling device 17 when the electric vehicle 10 and the external power supply PS are not electrically connected and the remaining capacity of the battery 11 is lower than Xth %. Xth % is a threshold value predetermined by the manufacturer of the electric vehicle 10 or the like in consideration of the distance-to-empty of the electric vehicle 10 using the electric power of the battery 11 and the like. Accordingly, it is possible to prevent the electric vehicle 10 from being unable to travel at a sufficient distance after parking or the battery 11 from getting into the over-discharged state, which can be caused by the cooling device 17 consuming the electric power of the battery 11 that is running out.

On the other hand, when the cooling condition of the battery 11 is satisfied and the electric vehicle 10 and the external power supply PS are electrically connected or the remaining capacity of the battery 11 is equal to or higher than Xth %, the cooling control unit 162 operates the cooling device 17. Accordingly, when the electric power required for the operation of the cooling device 17 can be appropriately secured, by operating the cooling device 17 cooling the battery 11, it is possible to suppress the deterioration of the battery 11 caused by the high-temperature state of the battery 11.

It is also conceivable that the electrical connection between the electric vehicle 10 and the external power supply PS gets disconnected (for example, plug off) during the operation of the cooling device 17. In such a case, the cooling control unit 162 determines, based on the remaining capacity of the battery 11, whether the operation of the cooling device 17 should be continued when the electrical connection between the electric vehicle 10 and the external power supply PS gets disconnected. Specifically, the cooling control unit 162 continues the operation of the cooling device 17 when the remaining capacity of the battery 11 at the time of disconnection is equal to or higher than Xth % and stops the operation of the cooling device 17 when the remaining capacity of the battery 11 at the time of disconnection is lower than Xth %. Further, even when the operation of the cooling device 17 is continued as described above, if the remaining capacity of the battery 11 gets lower than Xth % during the operation of the cooling device 17 thereafter, the cooling control unit 162 stops the operation of the cooling device 17 at that time. Therefore, when the electrical connection between the electric vehicle 10 and the external power supply PS gets disconnected, the cooling device 17 can be operated to cool the battery 11 only when the electric power required for the operation of the cooling device 17 can be appropriately secured.

The cooling control unit 162 is configured to set a target temperature that is a target value for cooling the battery 11 when operating the cooling device 17 and to operate the cooling device 17 so that the battery 11 is cooled to the target temperature. The target temperature is a temperature lower than the above Tth degree(s) Celsius and is set based on a future predicted air temperature around the electric vehicle 10, the traveling/parking schedule of the electric vehicle 10, and the like, for example.

Specifically, for example, when it is predicted that the air temperature around the electric vehicle 10 will decrease, the cooling control unit 162 sets the target temperature to be relatively high as compared with other cases. Accordingly, it is possible to suppress the waste of electric power by the cooling device 17 cooling the battery 11 more than necessary. The future predicted air temperature around the electric vehicle 10 can be acquired from a weather information server that distributes weather information via the communication device 181, for example. In order to acquire the future predicted air temperature around the electric vehicle 10, the battery monitoring device 16 may send the weather information server the current position of the electric vehicle 10 acquired from the navigation device 182 or the like.

When the current parking time of the electric vehicle 10 is short, and the traveling of the electric vehicle 10 is scheduled to be started again before the battery 11 is sufficiently cooled, since the temperature of the battery 11 is predicted to increase further, the cooling control unit 162 sets the target temperature to be relatively low as compared with other cases. Accordingly, even when the parking time of the electric vehicle 10 will be short, and the traveling will be resumed immediately, it is possible to suppress the battery 11 from reaching a high temperature.

As described above, in the present embodiment, when the electric power required for the operation of the cooling device 17 cannot be appropriately secured, the cooling device 17 is not operated. However, it is not preferable from a viewpoint of suppressing the deterioration of the battery 11 that the high-temperature state of the battery 11 lasts for a long period of time due to the cooling device 17 not being operated.

Therefore, when the electric vehicle 10 and the external power supply PS are not electrically connected, and the cooling condition of the battery 11 is satisfied, the notice control unit 163 issues a connection recommendation notice that urges the user or the owner of the electric vehicle 10 to electrically connect the electric vehicle 10 and the external power supply PS. Accordingly, if the electric vehicle 10 and the external power supply PS are not electrically connected when the battery 11 is required to be cooled, it is possible to urge the user of the electric vehicle 10 or the like to connect the electric vehicle 10 and the external power supply PS. Therefore, opportunity at which the electric power for operating the cooling device 17 can be secured to cool the battery 11 can be increased, so that the deterioration of the battery 11 caused by the high-temperature state of the battery 11 can be suppressed.

Figure 5:
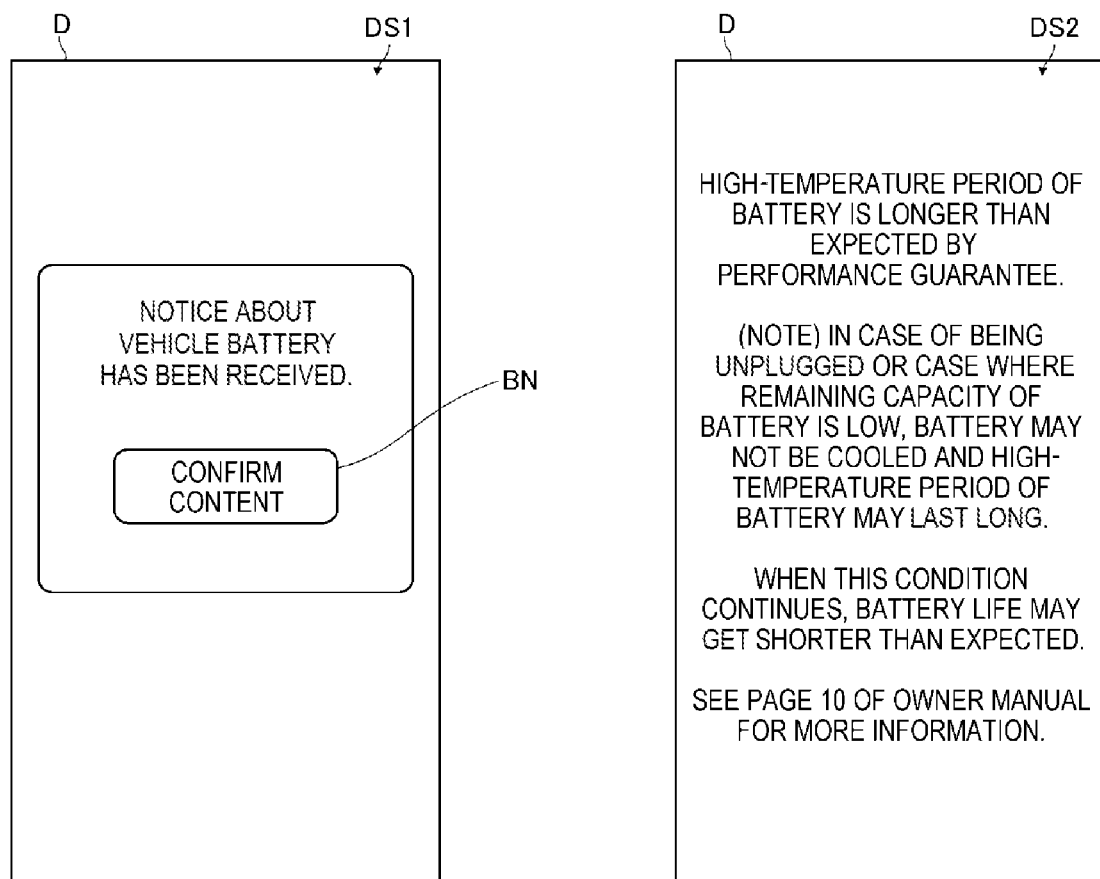
FIG. 5 is a diagram showing an example of a display scene shown with a guarantee guidance notice by the battery monitoring device of FIG. 2.

The connection recommendation notice can be executed by transmitting a message or image data that urges the electrical connection between the electric vehicle 10 and the external power supply PS to the terminal device 30 via the communication device 181 and showing the message or the image on the display of the terminal device 30 (for example, see a reference sign D in FIG. 5).

As described above, in the present embodiment, even if the electric vehicle 10 and the external power supply PS are not electrically connected, when the remaining capacity of the battery 11 is equal to or higher than Xth %, the cooling device 17 is operated. Accordingly, when the electric vehicle 10 and the external power supply PS are not electrically connected but the electric power required for the operation of the cooling device 17 can be secured, if the connection recommendation notice is issued, the user or the owner of the electric vehicle 10 may have a troublesome feeling.

Therefore, the notice control unit 163 issues the connection recommendation notice when the electric vehicle 10 and the external power supply PS are not electrically connected, the cooling condition of the battery 11 is satisfied, and the remaining capacity of the battery 11 is lower than Xth %. In other words, when the electric vehicle 10 and the external power supply PS are not electrically connected, the cooling condition of the battery 11 is satisfied, and the remaining capacity of the battery 11 is equal to or higher than Xth %, the notice control unit 163 does not issue the connection recommendation notice. Accordingly, even if the electric vehicle 10 and the external power supply PS are not electrically connected but the electric power required for the operation of the cooling device 17 can be appropriately secured, it is possible to prevent the connection recommendation notice from being issued and the user of the electric vehicle 10 or the like from being bothered by excessive connection recommendation notices.

The notice control unit 163 may issue the connection recommendation notice not only in the case described above but also in other cases. For example, when the user gets off the electric vehicle 10 (for example, when the electric vehicle 10 is parked), if the electric vehicle 10 and the external power supply PS are not electrically connected, the connection recommendation notice may be issued. In this way, it is possible to issue the connection recommendation notice while the user is near the electric vehicle 10, that is, while the time and effort for connecting the electric vehicle 10 and the external power supply PS can be reduced, so that the connection between the electric vehicle 10 and the external power supply PS can be urged.

For example, when the air temperature around the electric vehicle 10 is equal to or higher than a predetermined value (for example, Tth degree(s) Celsius), it is predicted that the battery 11 will need to be cooled. For this reason, the notice control unit 163 may issue the connection recommendation notice in a case where the air temperature around the electric vehicle 10 gets equal to or higher than the predetermined value when the electric vehicle 10 is parked or in a case where the air temperature around the electric vehicle 10 is equal to or higher than the predetermined value when the electric vehicle 10 is parked.

When the cooling device 17 is operated in a state where the electric vehicle 10 and the external power supply PS are not electrically connected, it is predicted that the remaining capacity of the battery 11 will be reduced. Therefore, the notice control unit 163 may issue the connection recommendation notice when the cooling device 17 is operated in a state where the electric vehicle 10 and the external power supply PS are not electrically connected or when the cooling of the battery 11 is completed and the operation of the cooling device 17 is stopped.

When the connection recommendation notice is issued, the notice control unit 163 may store, in the storage unit 165, information indicating a time at which the connection recommendation notice has been issued (that is, a history of the connection recommendation notice) or the like.

As described above, a life of the battery 11 varies greatly depending on how the battery 11 has been used. Therefore, if the battery 11 is used in an inappropriate state such as where the battery 11 is left in the high-temperature state, so that the life of the battery 11 may get significantly shorter than a life assumed in advance as a performance guarantee. If the information on the performance guarantee of the battery 11 can be offered to the user or the like who uses the battery 11 (that is, the electric vehicle 10) unintentionally in a state where the life of the battery 11 can be shortened, it is conceivable that the usage of the battery 11 can be improved, that is, use of the battery 11 in an appropriate state can be urged.

Therefore, the notice control unit 163 is configured to determine, based on the battery-related information acquired by the battery-related information acquisition unit 161, whether there is influence on the performance guarantee of the battery 11 and to issue a guarantee guidance notice for providing the information on the performance guarantee of the battery 11 to the user or the owner of the electric vehicle 10 based on a determination result.

Specifically, the notice control unit 163 is configured to count the cumulative high-temperature period based on the battery-related information acquired by the battery-related information acquisition unit 161 and to determine whether there is influence on the performance guarantee of the battery 11 based on a count result. Hereinafter, an example of the determination of whether there is influence on the performance guarantee of the battery 11 will be described with reference to FIG. 4.

Figure 4:
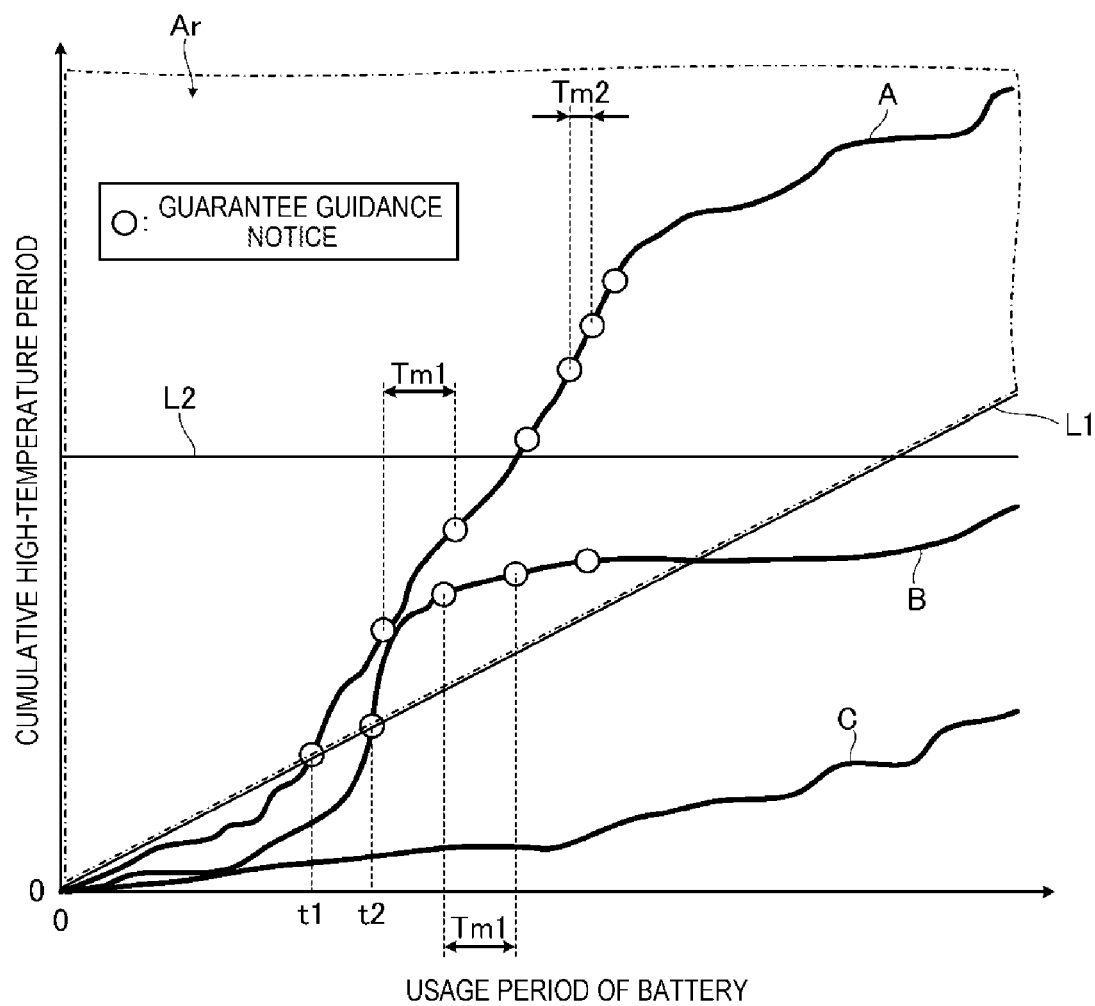
FIG. 4 is a diagram showing an example of determining influence on a performance guarantee of a battery by the battery monitoring device of FIG. 2.

In FIG. 4, a vertical axis represents the cumulative high-temperature period, and a horizontal axis represents a usage period of the battery 11. The usage period of the battery 11 is an elapsed time from the start of use of the battery 11. The battery monitoring device 16 is configured to acquire information indicating the elapsed time from the start of use of the battery 11 to the present, that is, the current usage time of the battery 11.

As shown in FIG. 4, in the present embodiment, a marginal line L1, which indicates the cumulative high-temperature period and is a condition for determining that there is influence on the performance guarantee, is predetermined by the manufacturer of the electric vehicle 10 or the like. The cumulative high-temperature period indicated by the marginal line L1 is set to be longer in accordance with the length of the usage period of the battery 11 in consideration of the characteristics of the battery 11 and the like. More specifically, the cumulative high-temperature period indicated by the marginal line L1 is set to "0" when the usage period of the battery 11 is "0" and is set to be longer as the usage period of the battery 11 gets longer.

When the count result of the cumulative high-temperature period is equal to or longer than the cumulative high-temperature period corresponding to the current usage period of the battery 11 in the marginal line L1, the notice control unit 163 determines that there is influence on the performance guarantee of the battery 11 and issues the guarantee guidance notice. Note that an area in which the cumulative high-temperature period indicated by the marginal line L1 is set to a lower limit value, that is, an area surrounded by a dash-dotted line in FIG. 4, is also referred to as a notice area Ar.

For example, in a case of a first example A shown in FIG. 4, when the usage period of the battery 11 reaches to t1, the count result of the cumulative high-temperature period gets into the notice area Ar. Therefore, in the case of the first example A, the guarantee guidance notice is issued when the usage period of the battery 11 reaches to t1 (see a white circle on a line indicated by a reference sign A in FIG. 4).

In a case of a second example B shown in FIG. 4, when the usage period of the battery 11 reaches to t2 after t1, the count result of the cumulative high-temperature period gets into the notice area Ar. Therefore, in the case of the second example B, the guarantee guidance notice is issued when the usage period of the battery 11 reaches to t2 (see a white circle on a line indicated by a reference sign B in FIG. 4).

In a case of a third example C shown in FIG. 4, the count result of the cumulative high-temperature period is not in the notice area Ar at any time in the usage period of the battery 11. Therefore, in the case of the third example C, the guarantee guidance notice is not issued.

Note that, if the guarantee guidance notice is excessively issued even when there is influence on the performance guarantee of the battery 11, the user or the owner of the electric vehicle 10 may have a troublesome feeling. Therefore, it is preferable that the guarantee guidance notice is issued at an appropriate frequency.

Therefore, when the count result of the cumulative high-temperature period counted based on the battery-related information is equal to or longer than the cumulative high-temperature period corresponding to the current usage period of the battery 11 in the marginal line L1 and is shorter than a cumulative high-temperature period indicated by a frequency changing line L2, the notice control unit 163 issues the guarantee guidance notice at a first frequency. As shown in FIG. 4, the first frequency is a frequency at which the guarantee guidance notice is issued at intervals of a period Tm1.

Then, when the cumulative high-temperature period exceeds the marginal line L1 and is equal to or longer than the cumulative high-temperature period indicated by the frequency changing line L2, the notice control unit 163 issues the guarantee guidance notice at a second frequency, higher than the first frequency. As shown in FIG. 4, the second frequency is a frequency at which the guarantee guidance notice is issued at intervals of a period Tm2 (where Tm2<Tm1). Accordingly, the guarantee guidance notice can be issued at an appropriate frequency in accordance with the length of the cumulative high-temperature period. That is, when the cumulative high-temperature period is relatively short (that is, when the influence on the deterioration of the battery 11 is small), the guarantee guidance notice can be issued at a lower frequency, and when the cumulative high-temperature period is relatively long (that is, when the influence on the deterioration of the battery 11 is large), the guarantee guidance notice can be issued at a higher frequency.

The frequency changing line L2 is predetermined by the manufacturer of the electric vehicle 10 or the like in consideration of the marginal line L1 and the influence of the cumulative high-temperature period on the deterioration of the battery 11. Similarly to the marginal line L1, the cumulative high-temperature period indicated by the frequency changing line L2 may be set to be longer as the usage period of the battery 11 gets longer.

The guarantee guidance notice can be issued by transmitting the information on the performance guarantee of the battery 11 to the terminal device 30 via the communication device 181 and showing the information on the display of the terminal device 30 (for example, see the reference sign D in FIG. 5). Examples of the information on the performance guarantee of the battery 11 include information indicating a range of the performance guarantee of the battery 11 in normal use, information indicating that the cumulative high-temperature period may affect the performance guarantee of the battery 11, information indicating a reference to an owner manual at which the performance guarantee of the battery 11 is described, and the like.

Here, the reference to the owner manual may be, for example, a page in which the performance guarantee of the battery 11 is described in a case where the owner manual is a document (including not only a document printed on paper but also a document recorded on a recording medium such as a CD-ROM). In addition, the reference to the owner manual may be, for example, a URL of a web page in which the performance guarantee of the battery 11 is described in a case where the owner manual is provided via the Internet or the like.

Note that, when the information on the performance guarantee of the battery 11 is shown every time the guarantee guidance notice is provided, the user or the owner of the electric vehicle 10 may have a troublesome feeling. In addition, when the information on the performance guarantee of the battery 11 is shown every time the guarantee guidance notice is provided, the user or the owner of the electric vehicle 10 may feel excessive anxiety.

Therefore, the notice control unit 163 is configured to issue the guarantee guidance notice, where the information on the performance guarantee of the battery 11 is shown with screen transition performed. More specifically, as shown in FIG. 5, the notice control unit 163 first shows a first display scene DS1 on the display D of the terminal device 30 that has received the guarantee guidance notice. In the first display scene DS1, the information on the performance guarantee of the battery 11 is not shown, and instead, an operation button BN for receiving an operation for showing the information (that is, an operation for showing a second display scene DS2 to be described later) is shown.

Then, when the operation button BN is operated (for example, touched), the notice control unit 163 shows the second display scene DS2, where the information on the performance guarantee of the battery 11 is shown. That is, unless the operation button BN is operated, the second display scene DS2 is not shown. Therefore, for example, the user who does not want showing of the second display scene DS2 operates (for example, touches) a portion other than the operation button BN on the first display scene DS1 so that it is possible to close the first display scene DS1 and return to a previous scene where the guarantee guidance notice has not been received. As a result, it is possible to prevent the user who does not want showing of the information on the performance guarantee of the battery 11 from being annoyed or feeling excessive anxiety by showing of the information.

When the notice control unit 163 issues the guarantee guidance notice, the notice control unit 163 may store, in the storage unit 165, information indicating a time at which the guarantee guidance notice has been issued (that is, a history of the guarantee guidance notice) or the like.

Figure 6:
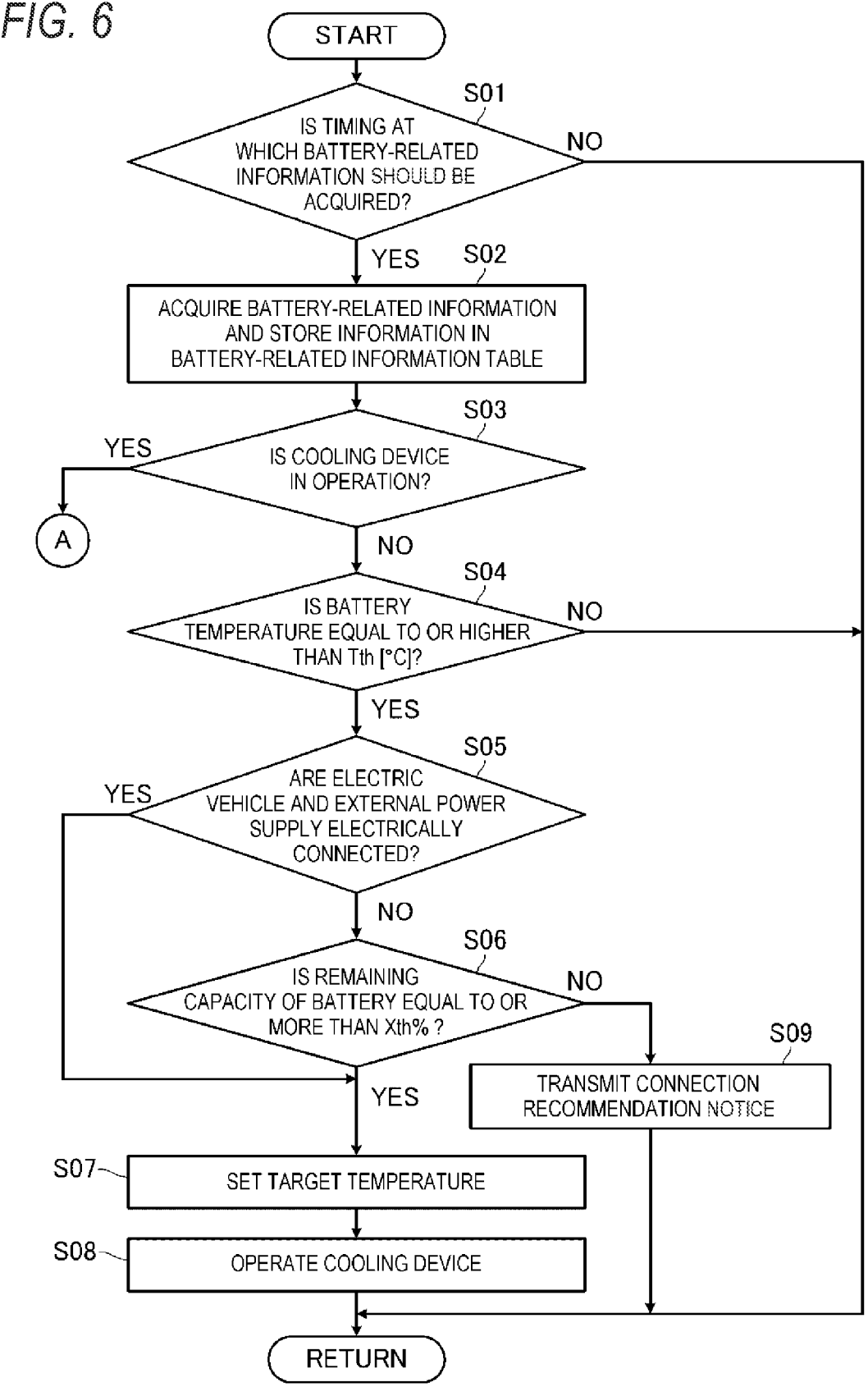
FIG. 6 is a flowchart (part 1) showing an example of a cooling control process executed by the battery monitoring device of FIG. 2.

[Cooling Control Process] Next, an example of a process executed by the battery monitoring device 16 will be described. For example, when the electric vehicle 10 is parked, the battery monitoring device 16 executes the cooling control process shown in FIGS. 6 and 7 at a predetermined cycle.

In the cooling control process, first, the battery monitoring device 16 determines, based on the time measured by the RTC 169 (step S01), whether it is a timing at which the battery-related information should be acquired. When the battery monitoring device 16 determines that it is not the timing at which the battery-related information should be acquired (NO in step S01), the battery monitoring device 16 ends the cooling control process.

On the other hand, when the battery monitoring device 16 determines that it is the timing at which the battery-related information should be acquired (YES in step S01), the battery monitoring device 16 acquires the battery-related information and stores the acquired battery-related information in the battery-related information table 50 (step S02).

Next, the battery monitoring device 16 determines whether the cooling device 17 is in operation (step S03). When the battery monitoring device 16 determines that the cooling device 17 is not in operation (NO in step S03), the battery monitoring device 16 determines whether the battery temperature is equal to or higher than Tth degree(s) Celsius based on the most recently acquired battery-related information (step S04). When the battery monitoring device 16 determines that the battery temperature is lower than Tth degree(s) Celsius (NO in step S04), the battery monitoring device 16 ends the cooling control process.

On the other hand, when the battery monitoring device 16 determines that the battery temperature is equal to or higher than Tth degree(s) Celsius (YES in step S04), the battery monitoring device 16 determines whether the electric vehicle 10 and the external power supply PS are electrically connected based on the most recently acquired battery-related information (step S05). When the battery monitoring device 16 determines that the electric vehicle 10 and the external power supply PS are electrically connected (YES in step S05), the process proceeds to step S07 to be described later.

When the battery monitoring device 16 determines that the electric vehicle 10 and the external power supply PS are not electrically connected (NO in step S05), the battery monitoring device 16 determines whether the remaining capacity of the battery 11 is equal to or higher than Xth % based on the most recently acquired battery-related information (step S06). Further, when the battery monitoring device 16 determines that the remaining capacity of the battery 11 is equal to or higher than Xth % (YES in step S06), the process proceeds to step S07, and the battery monitoring device 16 sets the target temperature of the battery 11 (step S07), starts the operation of the cooling device 17 (step S08), and ends the cooling control process.

When the battery monitoring device 16 determines that the remaining capacity of the battery 11 is lower than Xth % (NO in step S06), the battery monitoring device 16 transmits the connection recommendation notice to the terminal device 30 (step S09) and ends the cooling control process.

Although, in the example described here, the connection recommendation notice is transmitted only when the electric power required for the operation of the cooling device 17 cannot be appropriately secured, the present invention is not limited thereto. For example, the connection recommendation notice may be transmitted even when the cooling device 17 is operated in a state where the electric vehicle 10 and the external power supply PS are not electrically connected.

Figure 7:
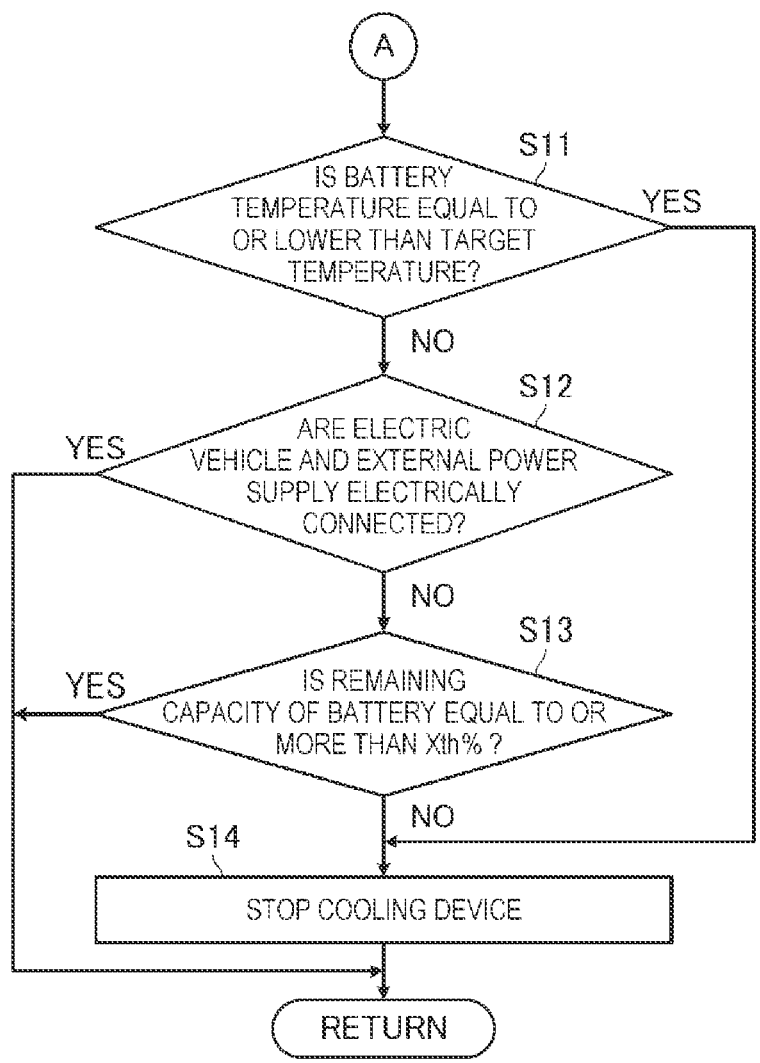
FIG. 7 is a flowchart (part 2) showing an example of a cooling control process executed by the battery monitoring device of FIG. 2.

In step S03, when the battery monitoring device 16 determines that the cooling device 17 is in operation (YES in step S03), the process proceeds to step S11 shown in FIG. 7, and the battery monitoring device 16 determines whether the battery temperature has been equal to or lower than the target temperature (target temperature that is set when the operation of the cooling device 17 is started) based on the most recently acquired battery-related information (step S11). When the battery monitoring device 16 determines that the battery temperature has been equal to or lower than the target temperature (YES in step S11), the process proceeds to step S14 to be described later.

On the other hand, when the battery monitoring device 16 determines that the battery temperature has not been equal to or lower than the target temperature (NO in step S11), the battery monitoring device 16 determines whether the electric vehicle 10 and the external power supply PS are electrically connected based on the most recently acquired battery-related information (step S12). When the battery monitoring device 16 determines that the electric vehicle 10 and the external power supply PS are electrically connected (YES in step S12), the battery monitoring device 16 ends the cooling control process. That is, in this case, since the process of step S14 to be described later is not executed, the operation of the cooling device 17 is continued.

When the battery monitoring device 16 determines that the electric vehicle 10 and the external power supply PS are not electrically connected (NO in step S12), the battery monitoring device 16 determines whether the remaining capacity of the battery 11 is equal to or higher than Xth % based on the most recently acquired battery-related information (step S13). When the battery monitoring device 16 determines that the remaining capacity of the battery 11 is equal to or higher than Xth % (YES in step S13), the battery monitoring device 16 ends the cooling control process. That is, in this case, since the process of step S14 to be described later is not executed, the operation of the cooling device 17 is continued.

When the battery monitoring device 16 determines that the remaining capacity of the battery 11 is lower than Xth % (NO in step S13), the battery monitoring device 16 proceeds to step S14 to stop the operation of the cooling device 17 (step S14), and the cooling control process is ended.

Figure 8:
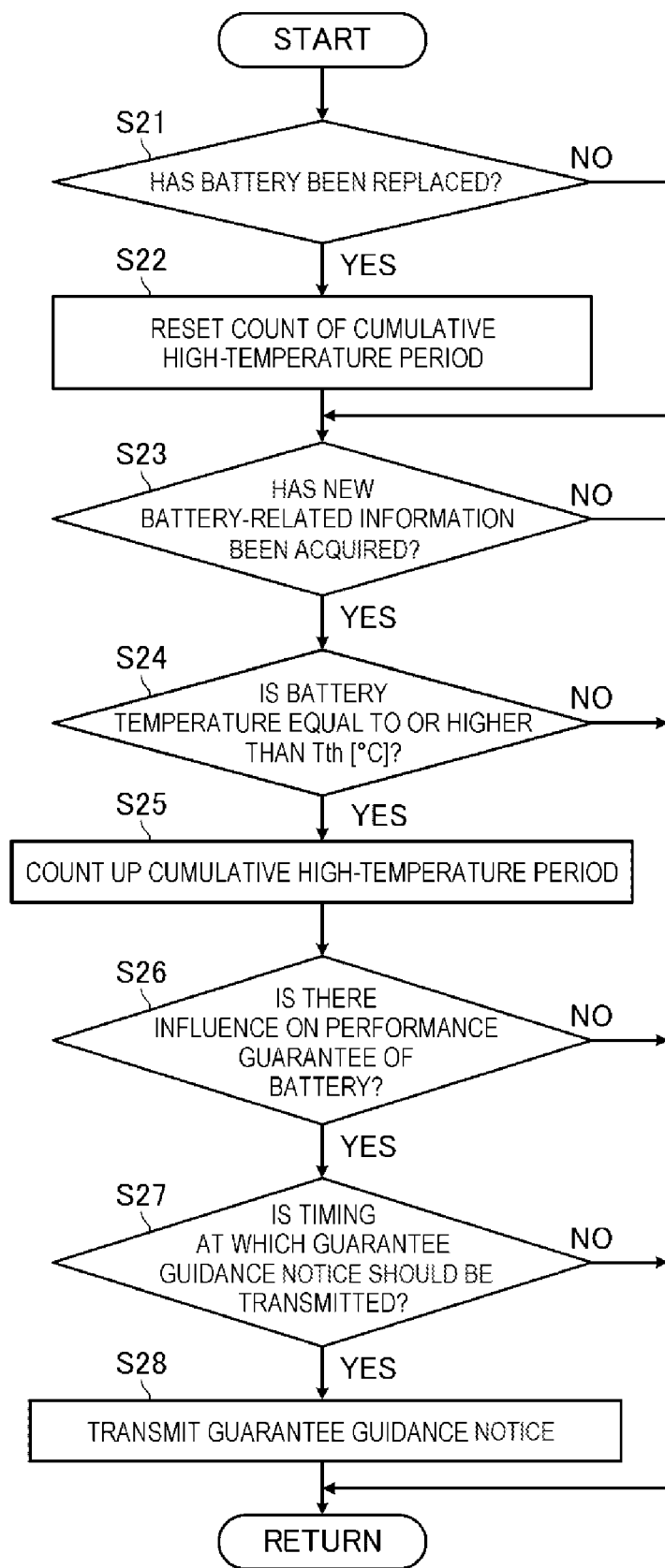
FIG. 8 is a flowchart showing an example of a cumulative high-temperature period counting process executed by the battery monitoring device of FIG. 2.

[Cumulative High-temperature Period Counting Process]
For example, when the electric vehicle 10 is parked, the battery monitoring device 16 executes the cumulative high-temperature period counting process shown in FIG. 8 at a predetermined cycle. More specifically, for example, the battery monitoring device 16 executes the cumulative high-temperature period counting process each time the above-described cooling control process is executed.

In the cumulative high-temperature period counting process, first, the battery monitoring device 16 determines whether the battery 11 has been replaced (step S21). Determining whether the battery 11 has been replaced may be by inquiring of the battery IC of the battery 11 about the battery ID and determining whether the battery ID obtained thereby is different from the battery ID stored in the battery-related information table 50, for example. When the battery monitoring device 16 determines that the battery 11 has not been replaced (NO in step S21), the process proceeds to step S23 to be described later.

On the other hand, when the battery monitoring device 16 determines that the battery 11 has been replaced (YES in step S21), the battery monitoring device 16 resets the cumulative high-temperature period counted so far (step S22) and returns the count of the cumulative high-temperature period to "0." In this way, when the battery 11 has been replaced, the cumulative high-temperature period for the replaced battery 11 can be accurately counted by resetting the count of the cumulative high-temperature period. Therefore, even when the battery 11 has been replaced, the guarantee guidance notice after the replacement can be issued at an appropriate timing.

Next, the battery monitoring device 16 determines whether new battery-related information has been acquired after the previous cumulative high-temperature period counting process (step S23). When the battery monitoring device 16 determines that new battery-related information has not been acquired (NO in step S23), the battery monitoring device 16 ends the cumulative high-temperature period counting process.

On the other hand, when the battery monitoring device 16 determines that the new battery-related information has been acquired (YES in step S23), the battery monitoring device 16 determines whether the battery temperature is equal to or higher than Tth degree(s) Celsius based on the newly acquired battery-related information (step S24). Further, when the battery monitoring device 16 determines that the battery temperature has been lower than Tth degree(s) Celsius (NO in step S24), the battery monitoring device 16 ends the cumulative high-temperature period counting process.

When the battery monitoring device 16 determines that the battery temperature is equal to or higher than Tth degree(s) Celsius (YES in step S24), the battery monitoring device 16 counts up the cumulative high-temperature period (step S25). For example, when the battery-related information is acquired every minute, in step S25, the battery monitoring device 16 counts one minute in for the cumulative high-temperature period.

Next, the battery monitoring device 16 determines whether there is influence on the performance guarantee of the battery 11 based on the count result of the cumulative high-temperature period (step S26). Further, when the battery monitoring device 16 determines that there is no influence on the performance guarantee of the battery 11 (NO in step S26), the battery monitoring device 16 ends the cumulative high-temperature period counting process.

On the other hand, when the battery monitoring device 16 determines that there is influence on the performance guarantee of the battery 11 (YES in step S26), the battery monitoring device 16 determines, based on a frequency corresponding to the count result of the cumulative high-temperature period, whether it is a timing at which the guarantee guidance notice should be transmitted (step S27).

Further, when the battery monitoring device 16 determines that it is the timing at which the guarantee guidance notice should be transmitted (YES in step S27), the battery monitoring device 16 transmits the guarantee guidance notice to the terminal device 30 (step S28) and ends the cumulative high-temperature period counting process. When the battery monitoring device 16 determines that it is not the timing at which the guarantee guidance notice should be transmitted (NO in step S27), the battery monitoring device 16 ends the cumulative high-temperature period counting process.

As described above, according to the battery monitoring device 16, appropriate management of the battery 11 of the electric vehicle 10 can be supported, so that use of the battery 11 in an appropriate state can be urged.

Although the embodiment of the present invention has been described above, the present invention is not limited to the embodiment described above. Modifications, improvements, or the like can be made as appropriate.

For example, in the embodiment described above, an example has been described in which the battery management support device according to the present invention is realized by the battery monitoring device 16 provided in the electric vehicle 10, but the present invention is not limited thereto. The battery management support device according to the present invention can also be realized by, for example, a server capable of communicating with the electric vehicle 10. Hereinafter, an example in which the battery management support device according to the present invention is realized by a server capable of communicating with the electric vehicle 10 will be described with reference to FIG. 9. In the following description, the same components as those of the embodiment described above are denoted by the same reference numerals, and a description thereof will be appropriately omitted.

Figure 9:
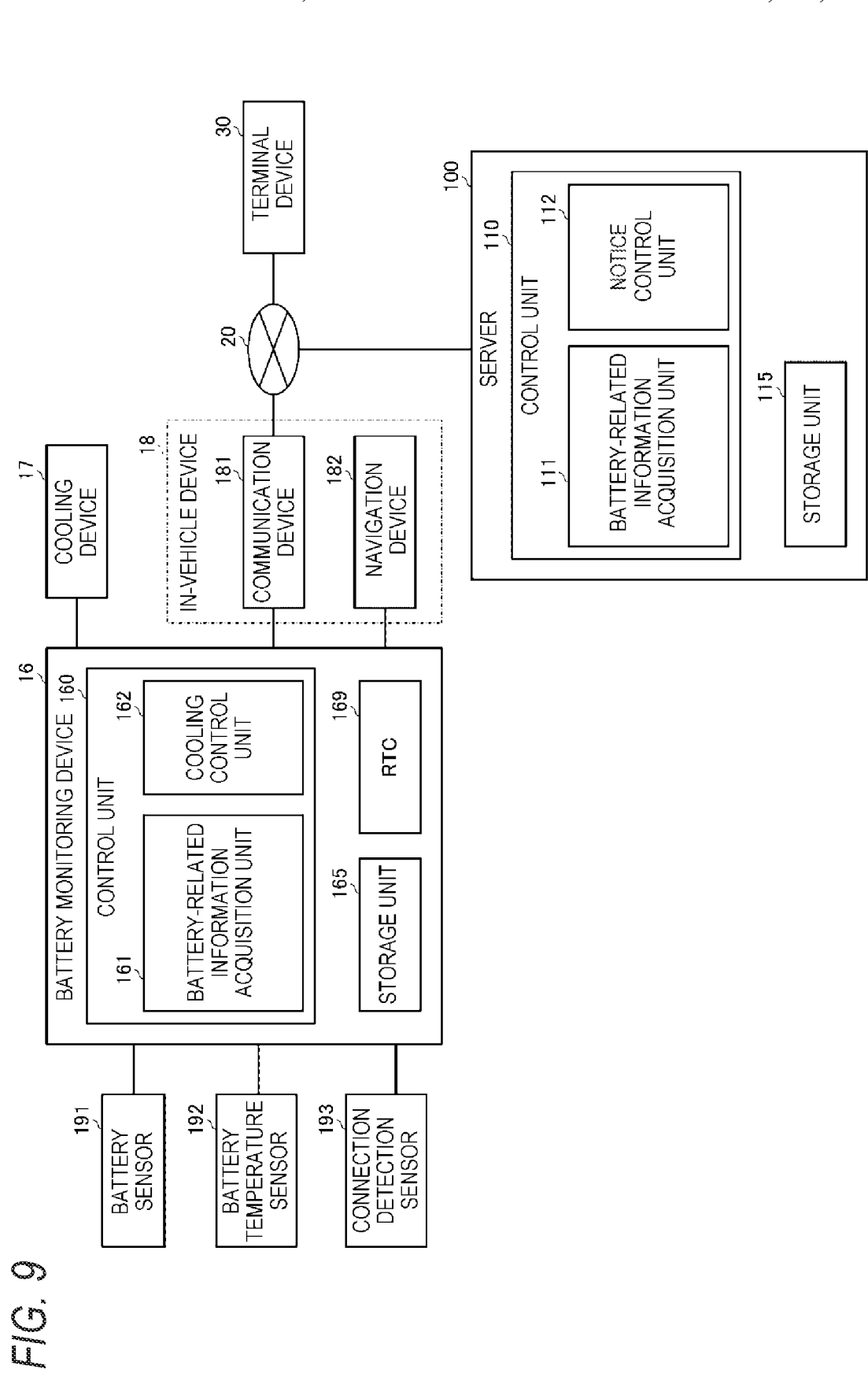
FIG. 9 is a diagram showing a modification of the embodiment of the present invention.

In FIG. 9, a server 100 is a server (computer) capable of communicating with the electric vehicle 10 and the terminal device 30 via the network 20 and is managed by, for example, the manufacturer of the electric vehicle 10. Here, in order to simplify the description, an example will be described in which one electric vehicle 10 and one terminal device 30 are connected to the server 100, but the present invention is not limited thereto. A plurality of electric vehicles 10 and a plurality of terminal devices 30 may be connected to the server 100. When the plurality of electric vehicles 10 and the plurality of terminal devices 30 are connected to the server 100, for example, the terminal device 30 corresponding to each of the electric vehicles 10 is preset in the server 100.

When the battery-related information acquisition unit 161 acquires the battery-related information, the battery monitoring device 16 of the electric vehicle 10 transmits the acquired battery-related information to the server 100 via the communication device 181. At this time, the battery monitoring device 16 also transmits, for example, a vehicle ID (for example, a chassis number) for identifying the electric vehicle 10 and the battery ID of the battery 11 together with the battery-related information.

The server 100 includes a control unit 110 and a storage unit 115. The control unit 110 is a functional unit that is configured to perform various controls in the server 100 and is realized, for example, by a processor executing a program stored in a storage device of a computer (the server 100). In addition, the storage unit 115 is a functional unit that stores a processing result (for example, battery-related information) of the control unit 110 and is realized by, for example, the storage device of the computer (the server 100).

The control unit 110 includes a battery-related information acquisition unit 111 that is configured to acquire the battery-related information received by the server 100 from the battery monitoring device 16 and a notice control unit 112 that is configured to issue various notices based on the battery-related information acquired by the battery-related information acquisition unit 111.

When the server 100 receives the battery-related information from the battery monitoring device 16, the battery-related information acquisition unit 111 acquires the received battery-related information and stores the acquired battery-related information in the storage unit 115. At this time, the battery-related information acquisition unit 111 stores the battery-related information for each electric vehicle 10 and each battery 11 based on the vehicle ID and the battery ID of the battery 11 received together with the battery-related information, for example. That is, in the storage unit 115, for example, information associated with the vehicle ID is stored in the battery-related information table 50 shown in FIG. 3.

Similar to the example of the notice control unit 163 described above, for example, when the electric vehicle 10 and the external power supply PS are not electrically connected, and the cooling condition of the battery 11 is satisfied, the notice control unit 112 transmits the connection recommendation notice to the terminal device 30, so that the user of the electric vehicle 10 or the like is urged to electrically connect the electric vehicle 10 and the external power supply PS.

Similarly to the example of the notice control unit 163 described above, for example, the notice control unit 112 determines whether there is influence on the performance guarantee of the battery 11 based on the battery-related information acquired by the battery-related information acquisition unit 111 and transmits the guarantee guidance notice to the terminal device 30 based on a determination result, thereby offering the information on the performance guarantee of the battery 11 to the user or the owner of the electric vehicle 10.

When the notice control unit 112 issues the connection recommendation notice or the guarantee guidance notice, the notice control unit 112 may store information indicating a time at which the notice has been issued (that is, a history of these notices) or the like in the storage unit 115.

As described above, according to the server 100, similar to the example of the battery monitoring device 16 described above, appropriate management of the battery 11 of the electric vehicle 10 can be supported, so that use of the battery 11 in an appropriate state can be urged.

Although, in the embodiment described above, the example in which the connection recommendation notice and the guarantee guidance notice are shown on the terminal device 30 has been described, the present invention is not limited thereto. For example, the connection recommendation notice or the guarantee guidance notice may be shown on a display mounted on the electric vehicle 10 such as a display of the navigation device 182.

The battery monitoring device 16 or the server 100 may output the battery-related information stored in the storage unit 165 or the storage unit 115 to the terminal device 30 or the navigation device 182 to show a list of the stored battery-related information on the display of the terminal device 30 or the navigation device 182. Also, in that case, the user or the owner of the electric vehicle 10 can grasp the information about how the battery 11 has been used in the electric vehicle 10, so that appropriate management of the battery 11 can be supported.

The battery monitoring device 16 or the server 100 may be configured to output the battery-related information stored in the storage unit 165 or in the storage unit 115 to a diagnostic device such as a maintenance factory and to output the stored battery-related information to the diagnostic device to show the list on the display of the diagnostic device. In that case, a mechanic can grasp information about how the battery 11 has been used in the electric vehicle 10, so that maintenance and diagnosis of the electric vehicle 10 can be supported.

Although, in the embodiment described above, an example has been described in which the electric vehicle according to the present invention is the electric vehicle 10, the present invention is not limited thereto. For example, the electric vehicle according to the present invention may be a plug-in hybrid vehicle that includes an internal combustion engine in addition to the traction motor 13, or may be a fuel cell vehicle.

The battery management support method described in the above embodiment can be realized by a computer executing a program (battery management support program) prepared in advance. The battery management support program is recorded in a computer-readable recording medium and is executed by being read from the recording medium. In addition, the battery management support program may be distributed via a network such as the Internet.

In the present specification, at least the following matters are described. Although corresponding components or the like in the above embodiment are shown in parentheses, the present invention is not limited thereto.

(1) A battery management support device (battery monitoring device 16, server 100) that is configured to acquire information (battery-related information 51) on an electric vehicle (electric vehicle 10) including a battery (battery 11) that is rechargeable with electric power received from an external power supply (external power supply PS), in which the information includes at least:
information when the electric vehicle is parked indicating a temperature of the battery,
information when the electric vehicle is parked indicating an electrical connection state between the electric vehicle and the external power supply; and
information when the electric vehicle is parked indicating an operation state of a cooling device for the battery.

According to (1), since the information on the electric vehicle including the information when the electric vehicle is parked indicating the temperature of the battery, the electrical connection state between the electric vehicle and the external power supply, and the operation state of the cooling device of the battery can be acquired, the information about how the battery has been used in the electric vehicle can be grasped, so that appropriate management of the battery can be supported.

(2) The battery management support device according to (1),
in which, when it is determined, based on the information, that the electric vehicle and the external power supply are not electrically connected and a cooling condition of the battery is satisfied, a connection recommendation notice is issued to a user or an owner of the electric vehicle to urge an electrical connection between the electric vehicle and the external power supply.

According to (2), when it is determined that the electric vehicle and the external power supply are not electrically connected, and the cooling condition of the battery is satisfied, the user or the owner of the electric vehicle is urged to electrically connect the electric vehicle and the external power supply by issuing the connection recommendation notice. Accordingly, it is possible to increase opportunity at which the electric power for operating the cooling device can be secured to cool the battery, deterioration of the battery caused by high temperatures of the battery can be suppressed.

(3) The battery management support device according to (2),
in which, when it is determined, based on the information, that the electric vehicle and the external power supply are not electrically connected, the cooling condition is satisfied, and a remaining capacity of the battery is lower than a threshold value (Xth %), the connection recommendation notice is issued.

According to (3), when it is determined that the electric vehicle and the external power supply are not electrically connected, the cooling condition of the battery is satisfied, and the remaining capacity of the battery is lower than the threshold value, the connection recommendation notice is issued. Accordingly, only when the electric power for operating the cooling device cannot be appropriately secured, the connection recommendation notice is issued, so that it is possible to prevent the user of the electric vehicle or the like from being bothered by excessive connection recommendation notices.

(4) The battery management support device according to (2),
in which, the cooling condition is at least one of a condition that the temperature of the battery is equal to or higher than a threshold value (Tth degree(s) Celsius), a condition that the temperature of the battery is predicted to be equal to or higher than a threshold value, and a condition that an air temperature around the electric vehicle is equal to or higher than a threshold value.

According to (4), since the cooling device of the battery is operated when the cooling condition is at least one of the fact that the temperature of the battery is equal to or higher than the threshold value, the temperature of the battery is predicted to be equal to or higher than the threshold value, and the air temperature around the electric vehicle is equal to or higher than the threshold value, deterioration of the battery caused by high temperatures of the battery can be suppressed.

(5) The battery management support device according to (1),
in which, when it is determined, based on the information, that there is influence on a performance guarantee of the battery, a guarantee guidance notice for offering information on the performance guarantee of the battery is issued to the user or the owner of the electric vehicle.

According to (5), when it is determined that there is influence on the performance guarantee of the battery, the information on the performance guarantee of the battery is offered to the user or the owner of the electric vehicle by issuing the guarantee guidance notice, so that appropriate management of the battery can be supported with reference to the information on the performance guarantee of the battery.

(6) The battery management support device according to (5),
in which, the determining whether there is influence on the performance guarantee of the battery is based on a cumulative high-temperature period, which is an cumulative value of a high-temperature period in which the temperature of the battery is equal to or higher than a predetermined value.

According to (6), since the determining whether there is influence on the performance guarantee of the battery is based on the cumulative high-temperature period, which is the cumulative value of the high-temperature period in which the temperature of the battery is equal to or higher than the predetermined value, it is possible to determine whether there is influence on the performance guarantee of the battery in consideration of deterioration of the battery caused by high temperatures of the battery.

(7) The battery management support device according to (6), in which, the cumulative high-temperature period is reset when the battery is replaced in the electric vehicle.

According to (7), it is possible to appropriately count the cumulative high-temperature period even when the battery has been replaced in the electric vehicle.

(8) The battery management support device according to (6), in which, the guarantee guidance notice is issued at a first frequency when the cumulative high-temperature period is equal to or longer than a first threshold value (marginal line L1) that is a condition for determining that there is influence on the performance guarantee of the battery, and the guarantee guidance notice is issued at a second frequency higher than the first frequency when the cumulative high-temperature period exceeds the first threshold value and is equal to or longer than a second threshold value (frequency changing line L2).

According to (8), since the guarantee guidance notice is issued at the first frequency when the cumulative high-temperature period is equal to or longer than the first threshold value, and the guarantee guidance notice is issued at the second frequency, higher than the first frequency, when the cumulative high-temperature period exceeds the first threshold value and equal to or longer than the second threshold value, the guarantee guidance notice can be issued at an appropriate frequency in accordance with the length of the cumulative high-temperature period.

(9) The battery management support device according to (5), in which the guarantee guidance notice shows the information on the performance guarantee of the battery on a display mounted on the electric vehicle or a display (display D) of a terminal device of the user or the owner of the electric vehicle, and in which the information on the performance guarantee of the battery is shown on a condition that screen transition is performed on the display.

According to (9), since the information on the performance guarantee of the battery offered by the guarantee guidance notice is shown with screen transition performed, it is possible to prevent the user who does not want showing of the information from being annoyed or feeling excessive anxiety by showing of the information.

(10) The battery management support device according to (1), in which a target temperature, which is a target value for cooling the battery when the cooling device is operated, is set based on a future predicted air temperature around the electric vehicle or a traveling/parking schedule of the electric vehicle.

According to (10), since the target temperature, which is the target value for cooling the battery, is set based on the future predicted air temperature around the electric vehicle or the traveling/parking schedule of the electric vehicle, the battery can be appropriately cooled in consideration of these.

(11) A battery management support method for supporting battery management in an electric vehicle (electric vehicle 10) including a battery (battery 11) that is rechargeable with electric power received from an external power supply (external power supply PS), the method including:

a step (step S09) in which a predetermined notice is issued to a user or an owner of the electric vehicle in accordance with a determination result based on acquired information (battery-related information 51) of the electric vehicle.

in which the information includes at least:
information when the electric vehicle is parked indicating a temperature of the battery;
information when the electric vehicle is parked indicating an electrical connection state between the electric vehicle and the external power supply; and
information when the electric vehicle is parked indicating an operation state of a cooling device of the battery, and in which, in the step, when it is determined, based on the information, that the electric vehicle and the external power supply are not electrically connected, and a cooling condition of the battery is satisfied, a connection recommendation notice is issued to urge an electrical connection between the electric vehicle and the external power supply.

According to (11), when it is determined that the electric vehicle and the external power supply are not electrically connected, and the cooling condition of the battery is satisfied, the user or the owner of the electric vehicle is urged to electrically connect the electric vehicle and the external power supply by issuing the connection recommendation notice. Accordingly, it is possible to increase opportunity at which the electric power for operating the cooling device can be secured to cool the battery, so that deterioration of the battery caused by high temperatures of the battery can be suppressed.

(12) A battery management support method for supporting battery management in an electric vehicle (electric vehicle 10) including a battery (battery 11) that is rechargeable by electric power received from an external power supply (external power supply PS), the method including:

a step (step S28) in which a predetermined notice is issued to a user or an owner of the electric vehicle in accordance with a determination result based on acquired information (battery-related information 51) of the electric vehicle, in which the information includes at least:
information when the electric vehicle is parked indicating a temperature of the battery;
information when the electric vehicle is parked indicating an electrical connection state between the electric vehicle and the external power supply; and
information when the electric vehicle is parked indicating an operation state of a cooling device of the battery, and in which, in the step, when it is determined, based on the information, that there is influence on a performance guarantee of the battery, a guarantee guidance notice for offering information on the performance guarantee of the battery is issued.

According to (12), when it is determined that there is influence on the performance guarantee of the battery, the information on the performance guarantee of the battery is offered to the user or the owner of the electric vehicle by issuing the guarantee guidance notice, so that appropriate management of the battery can be supported with reference to the information on the performance guarantee of the battery.

What is claimed is:

1. A battery management support device that is configured to acquire information on an electric vehicle including a battery that is rechargeable with electric power received from an external power supply,
    wherein the information includes at least:
        information when the electric vehicle is parked indicating a temperature of the battery;
        information when the electric vehicle is parked indicating an electrical connection state between the electric vehicle and the external power supply; and
        information when the electric vehicle is parked indicating an operation state of a cooling device for the battery,
    wherein, when it is determined, based on the information, that there is influence on a performance guarantee of the battery, a guarantee guidance notice for offering information on the performance guarantee of the battery is issued to the user or the owner of the electric vehicle,
    wherein, the determining whether there is influence on the performance guarantee of the battery is based on a cumulative high-temperature period, which is a cumulative value of a high-temperature period in which the temperature of the battery is equal to or higher than a predetermined value, and
    wherein the guarantee guidance notice is issued at a first frequency when the cumulative high-temperature period is equal to or longer than a first threshold value that is a condition for determining that there is influence on the performance guarantee of the battery, and the guarantee guidance notice is issued at a second frequency higher than the first frequency when the cumulative high-temperature period exceeds the first threshold value and is equal to or longer than a second threshold value.

2. The battery management support device according to claim 1,
    wherein, when it is determined, based on the information, that the electric vehicle and the external power supply are not electrically connected and a cooling condition of the battery is satisfied, a connection recommendation notice is issued to a user or an owner of the electric vehicle to urge an electrical connection between the electric vehicle and the external power supply.

3. The battery management support device according to claim 2,
    wherein, when it is determined, based on the information, that the electric vehicle and the external power supply are not electrically connected, the cooling condition is satisfied, and a remaining capacity of the battery is lower than a threshold value, the connection recommendation notice is issued.

4. The battery management support device according to claim 2,
    wherein the cooling condition is at least one of a condition that the temperature of the battery is equal to or higher than a threshold value, a condition that the temperature of the battery is predicted to be equal to or higher than a threshold value, and a condition that an air temperature around the electric vehicle is equal to or higher than a threshold value.

5. The battery management support device according to claim 1,
    wherein the cumulative high-temperature period is reset when the battery is replaced in the electric vehicle.

6. The battery management support device according to claim 1,
    wherein the guarantee guidance notice shows the information on the performance guarantee of the battery on a display mounted on the electric vehicle or a display of a terminal device of the user or the owner of the electric vehicle, and
    wherein the information on the performance guarantee of the battery is shown on a condition that screen transition is performed on the display.

7. The battery management support device according to claim 1,
    wherein a target temperature, which is a target value for cooling the battery when the cooling device is operated, is set based on a future predicted air temperature around the electric vehicle or a traveling/parking schedule of the electric vehicle.

8. A battery management support method for supporting battery management in an electric vehicle including a battery that is rechargeable by electric power received from an external power supply, the method comprising:
    a step in which a predetermined notice is issued to a user or an owner of the electric vehicle in accordance with a determination result based on acquired information of the electric vehicle,
    wherein the information includes at least:
        information when the electric vehicle is parked indicating a temperature of the battery;
        information when the electric vehicle is parked indicating an electrical connection state between the electric vehicle and the external power supply; and
        information when the electric vehicle is parked indicating an operation state of a cooling device of the battery,
    wherein, in the step, when it is determined, based on the information, that there is influence on a performance guarantee of the battery, a guarantee guidance notice for offering information on the performance guarantee of the battery is issued,
    wherein, the determining whether there is influence on the performance guarantee of the battery is based on a cumulative high-temperature period, which is a cumulative value of a high-temperature period in which the temperature of the battery is equal to or higher than a predetermined value, and
    wherein the guarantee guidance notice is issued at a first frequency when the cumulative high-temperature period is equal to or longer than a first threshold value that is a condition for determining that there is influence on the performance guarantee of the battery, and the guarantee guidance notice is issued at a second frequency higher than the first frequency when the cumulative high-temperature period exceeds the first threshold value and is equal to or longer than a second threshold value.

* * * * *